US012729254B2

(12) United States Patent
Peng et al.

(10) Patent No.: US 12,729,254 B2
(45) Date of Patent: Sep. 8, 2026

(54) POLYETHYLENE COMPOSITIONS, ARTICLES THEREOF, AND METHODS THEREOF

(71) Applicant: ExxonMobil Chemical Patents Inc., Baytown, TX (US)

(72) Inventors: Haiqing Peng, Sugar Land, TX (US); Robert M. Canright, Huffman, TX (US); Jorge A. Guerra, Houston, TX (US); Wen Li, Houston, TX (US); Janice H. Sim, Austin, TX (US); Keith W. Trapp, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 292 days.

(21) Appl. No.: 18/702,935

(22) PCT Filed: Oct. 18, 2022

(86) PCT No.: PCT/US2022/078273

§ 371 (c)(1),
(2) Date: Apr. 19, 2024

(87) PCT Pub. No.: WO2023/081577

PCT Pub. Date: May 11, 2023

(65) Prior Publication Data

US 2025/0263508 A1 Aug. 21, 2025

Related U.S. Application Data

(60) Provisional application No. 63/274,796, filed on Nov. 2, 2021.

(51) Int. Cl.
*C08F 110/02* (2006.01)
*C08J 5/18* (2006.01)

(52) U.S. Cl.
CPC ............... *C08F 110/02* (2013.01); *C08J 5/18* (2013.01); *C08J 2323/06* (2013.01)

(58) Field of Classification Search
CPC ............................... C08F 10/02; C08F 110/02
See application file for complete search history.

(56) References Cited

U.S. PATENT DOCUMENTS

| | | | |
|---|---|---|---|
| 8,828,529 B2 | 9/2014 | St. Jean et al. | |
| 9,309,338 B2 | 4/2016 | St. Jean et al. | |
| 10,023,730 B2 | 7/2018 | Lam et al. | |
| 2015/0259444 A1 | 9/2015 | Rohatgi et al. | |
| 2021/0238320 A1* | 8/2021 | Doetsch | C08F 10/02 |
| 2021/0238321 A1 | 8/2021 | Silva et al. | |

FOREIGN PATENT DOCUMENTS

| | | |
|---|---|---|
| WO | 2021-041095 A1 | 3/2021 |

OTHER PUBLICATIONS

Marlex® 9656 Polyethylene, Product Data Sheet (Chevron Phillips Chemical Company Jul. 2020).
"High density polyethylene for MDO film applications," IPCOM000267015D (IP.com Sep. 16, 2021).

* cited by examiner

*Primary Examiner* — Prashant J Khatri
(74) *Attorney, Agent, or Firm* — C. Tumey Law Group PLLC

(57) ABSTRACT

The present disclosure relates to polyethylene compositions, articles including such polyethylene compositions, and methods of making polyethylene compositions and articles (e.g., films) thereof. In some embodiments, a method of making a polyethylene composition includes introducing ethylene, an optional comonomer, a diluent, a catalyst, and 30 ppm to 500 ppm of a cocatalyst to a loop reactor under conditions sufficient to produce a slurry comprising the polyethylene composition. The method includes continuously discharging a portion of the slurry from the loop reactor as effluent comprising the polyethylene composition. The method includes flashing the effluent to vaporize diluent and form a concentrated effluent comprising the polyethylene composition. The method includes condensing the vaporized diluent. The polyethylene composition comprises 80 wt % or greater ethylene-derived units and has a density within the range from 0.935 to 0.975 g/cm$^3$; and a melt index ($I_{2.16}$) of 2 g/10 min to 4 g/10 min.

20 Claims, No Drawings

POLYETHYLENE COMPOSITIONS, ARTICLES THEREOF, AND METHODS THEREOF

CROSS-REFERENCE TO RELATED APPLICATIONS

This application claims the benefit of and priority to PCT Application No. PCT/US2022/078273 filed Oct. 18, 2022, which in turn claims the benefit of U.S. Provisional Application No. 63/274,796 filed Nov. 2, 2021, entitled "Polyethylene Compositions, Articles Thereof, and Methods Thereof", the entireties of which are incorporated by reference herein.

FIELD

The present disclosure relates to polyethylene compositions, articles including such polyethylene compositions, methods of making polyethylene compositions, and articles (e.g., films) thereof.

BACKGROUND

High density polyethylenes (HDPE) are versatile resins. Their structures and properties can be tailored and made suitable for many fabrication processes and end use applications. For rigid parts, HDPE can be used for blow molded bottles, injection molded crates, extruded gas or water pipes, etc. HDPE can also be used in flexible packaging, such as grocery bags, compression packaging, stand-up pouch, where high holding force and stiffness are needed. HDPE may also be used for some niche applications such as packaging with good moisture barrier properties: packages for cereal, coffee, tea, pet foods, etc. Moisture barrier properties can be measured by a moisture vapor transmission rate (MVTR) per ASTM F1249.

In general, increasing crystallinity of a polymer would lead to higher moisture barrier properties. For example, decreasing co-monomer content and molecular weight promote increased crystallinity. However, there are practical considerations when reducing the co-monomer content or the molecular weight of the polymer. For example, resins are often converted to films by using a blown film process, so conventional wisdom dictates that molecular weight cannot be too low. Typically in the current state of the art, resins are expected to have a melt index (MI) of less than or equal to about 2 to be suitable for a process to form blown films. In some instances, a bimodal resin, such as ExxonMobil HD7925 (CE4, discontinued), with melt index about 2.5 is still filmable because of its high molecular weight tail. However, this kind of molecule design will lead to divergent film properties. In addition, the high molecular weight tail will hinder crystallization, and superior moisture vapor barrier properties cannot be achieved. Reducing co-monomer content not only impacts film physical properties, but also impacts optical properties and film appearance. For example, higher crystallinity typically leads to higher haze and lower gloss, and the package as a result may become less appealing to some consumers. Long chain branching and the broadness of molecular weight distribution of the polymer can also impact filmability, film physical properties and moisture barrier properties.

As one example, U.S. Pat. No. 9,309,338B2 discloses bimodal HDPE resins with MI less than or equal to about 1.1. By adjusting the modality, the haze of the films could be manipulated to range from 14 to 95%, and the MVTR changed from 0.6 g-mil/100 square inch/day to about 0.35 g-mil/100 square inch/day according to its embodiments. However, specifics of the film samples and MVTR measurements were not disclosed.

As another example, U.S. Pat. No. 10,023,730B2 discloses tri-modal Ziegler-Natta HDPE resins with MI less than 2 and very thick film providing an MVTR 0.36 g-mil/100 square inch/day. The film is made from a tri-modal MCN resin, with MI equal to 1.2, had MVTR 0.33 g-mil/100 square inch/day. In addition, when a nucleating agent was formulated to the resins, MVTR of film made from the tri-modal MCN resin was significantly improved. However, the disclosed MVTR was measured by using 1.5 mil film samples. It is well known that a thicker film means concomitantly lower MVTR (i.e., better moisture barrier). For example, the Marlex™ 9656 HDPE product data sheet illustrates the strong correlation between thicker films and lower MVTR. See Marlex® 9656 Polyethylene, Product Data Sheet (Chevron Phillips Chemical Company July 2020).

WO2021-041095 also disclosed HDPE compositions suitable for moisture barrier application. The disclosed resin has a bimodal composition, produced in 2 gas phase reactors in series. When nucleating agent was used, the MVTR values were reduced by about 50%. The disclosed MVTR values were based on measurement of 2 mil films. The method to fabricate film and essential physical properties were not included in the disclosures.

To produce bimodal or tri-modal resins, the commercial approach is to build extra reactors in series, which involves significant extra capital investments and increased manufacturing operation complexities. In addition, some resins use nucleating agents in the formulation to improve WVTR, but nucleating agent adds extra cost and potentially extra production steps in addition to food contact considerations. All the extra costs, for example, will be transferred to the end users (consumers).

There is a need for new polyethylene compositions, especially new and improved unimodal HDPE compositions having a melt index (MI) of greater than or equal to about 2, which can provide films having, e.g., superior MVTR with reduced film thickness and maintained or improved haze, and easy film extrusion process.

Additional reference of potential interest in this regard include: U.S. Pat. No. 9,309,338B2; U.S. Pat. No. 10,023,730B2; WO2021-041095; and "High density polyethylene for MDO film applications," IPCOM000267015D (IP.com Sep. 16, 2021).

SUMMARY

In some embodiments, a method of making a polyethylene composition includes introducing ethylene, an optional comonomer, a diluent, a catalyst, and 30 ppm to 500 ppm of a cocatalyst to a loop reactor under conditions sufficient to produce a slurry comprising the polyethylene composition. The method includes continuously discharging a portion of the slurry from the loop reactor as effluent comprising the polyethylene composition. The method includes flashing the effluent to vaporize diluent and form a concentrated effluent comprising the polyethylene composition. The method includes condensing the vaporized diluent. The polyethylene composition comprises 80 wt % or greater ethylene-derived units and has a density within the range from 0.935 to 0.975 g/cm$^3$; a melt index ($I_{2.16}$) of 2 g/10 min to 4 g/10 min; a weight-average molecular weight (Mw) of 90,000 g/mol to 300,000 g/mol; a number-average molecular weight (Mn) of 15,000 g/mol to 30,000 g/mol; a z-average molecular weight (Mz) of 700,000 to 3,000,000 g/mol; an Mw/Mn value of 9 to 12; an Mz/Mw value of 5 to 10; an Mz/Mn value of 65 to 80; and a g' value of 0.6 to 0.8. The polyethylene composition has unimodal molecular weight distribution.

In some embodiments, a polyethylene composition includes 80 wt % or greater ethylene-derived units. The polyethylene composition has: a density within the range from 0.935 to 0.975 g/cm$^3$; a melt index ($I_{2.16}$) of 2 g/10 min to 4 g/10 min; a weight-average molecular weight (Mw) of 90,000 g/mol to 300,000 g/mol; a number-average molecular weight (Mn) of 15,000 g/mol to 30,000 g/mol; a z-average molecular weight (Mz) of 700,000 to 3,000,000 g/mol; an Mw/Mn value of 9 to 12; an Mz/Mw value of 5 to 10; an Mz/Mn value of 65 to 80; and a g' value of 0.6 to 0.8. The polyethylene composition has unimodal molecular weight distribution.

In some embodiments, a film includes the polyethylene composition. The film has a thickness of 1 μm to 50 μm. The film includes a nucleating agent content of 1,000 ppm or less, and preferably is substantially devoid of nucleating agent (meaning nucleating agent is present, e.g., in an amount of 100 ppm or less, consistent with potential trace impurities).

DETAILED DESCRIPTION

The present disclosure relates to polyethylene compositions, articles including such polyethylene compositions, methods of making polyethylene compositions, and articles (e.g., films) thereof.

In some embodiments, the present disclosure provides methods of making polyethylene compositions, such as unimodal HDPE compositions, such as "broad unimodal" HDPE compositions. It has been discovered that an amount of a cocatalyst can affect the molecular weight distribution of polyethylene compositions of the present disclosure. For example, increasing an amount of triethyl aluminum from 75 ppm to 225 ppm may decrease the melt index ratio of a polyethylene composition which, without being bound by theory, is believed to assist polymer molecules to crystallize better under stress in a film in an extrusion process. Increasing an amount of cocatalyst can also increase the Mz/Mw value of a polyethylene composition, unexpectedly indicating higher molecular weight fraction growth, even though a reduction in melt index ratio (MIR) has been provided. Accordingly, a polyethylene composition of the present disclosure can have a low enough melt index for blown film processes. The films can also provide a low MVTR value, low haze, and good barrier properties such that the presence of a nucleating agent in a composition, blend, or film is merely optional and, in some embodiments, not present at all. The films can provide such advantages with relatively thin thickness, providing advantageous use as food packaging.

Definitions

The term "polyethylene" refers to a polymer having at least 50 wt % ethylene-derived units, such as at least 70 wt % ethylene-derived units, such as at least 80 wt % ethylene-derived units, such as at least 90 wt % ethylene-derived units, or at least 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "α-olefin" refers to an olefin having a terminal carbon-to-carbon double bond in the structure thereof $R^1R^2C{=}CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group.

For the purposes of the present disclosure, ethylene shall be considered an α-olefin.

When a polymer or copolymer is referred to herein as comprising an alpha-olefin (or α-olefin), including, but not limited to ethylene, 1-butene, and 1-hexene, the olefin present in such polymer or copolymer is the polymerized form of the olefin. For example, when a polymer is said to have an "ethylene content" or "ethylene monomer content" of 80 to 99.9 wt %, or to comprise "ethylene-derived units" at 80 to 99.9 wt %, it is understood that the mer unit in the copolymer is derived from ethylene in the polymerization reaction and said derived units are present at 80 to 99.9 wt %, based upon the weight of ethylene content plus comonomer content.

As used herein, and unless otherwise specified, the term "C." means hydrocarbon(s) having n carbon atom(s) per molecule, wherein n is a positive integer.

Various measurements described herein may be based on certain standardized testing procedures. For example, measurements of tensile strength in the machine direction (MD) and transverse direction (TD) can be made by following the procedure of ASTM D882. Measurements of yield strength in MD and TD can be made by following the procedure of ASTM D882. Measurements of Elmendorf tear strength in MD and TD can be made by following the procedure of ASTM D1922-09.

The "secant modulus" is the slope of a line connecting the origin to an object's stress/strain curve at a specified strain percentage. For example, the "1% secant modulus" is the slope of a line connecting the origin to an object's stress/strain curve at 1% strain. The secant modulus describes the overall stiffness of an object. Lower strain percentages typically approximate elastic behavior more accurately.

The term "tensile strength" refers to the stretching force required to inelastically deform a material. The tensile strength of a material can be measured by stretching the material in MD or TD. Tensile strength is measured in psi and can be tested via ASTM D882-10.

Polyethylene Compositions

In at least one embodiment, a process described herein produces polyethylene compositions such as polyethylene compositions including polyethylene homopolymers, and/or copolymers of ethylene and one, two, three, four or more $C_3$ to $C_{40}$ olefin comonomers, for example, $C_3$ to $C_{20}$ α-olefin comonomers.

For example, the polyethylene compositions may include copolymers of a $C_2$ to $C_{40}$ olefin and one, two or three or more different $C_2$ to $C_{40}$ olefins. In some embodiments, the polyethylene compositions include a majority of units derived from polyethylene, and units derived from one or more $C_3$ to $C_{40}$ comonomers, such as $C_3$ to $C_{20}$ α-olefin comonomers (e.g., propylene, 1-butene, 1-hexene, 1-octene, 1-decene, 1-dodecene, such as propylene, 1-butene, 1-hexene, 1-octene, or a mixture thereof; such as 1-butene and/or 1-hexene).

The polyethylene compositions may include the ethylene-derived units in an amount of at least 80 wt %, or 85 wt %, such as at least 90, 95, 96, 97, 98, or 99 wt % (for instance, in a range from a low of 80, 85, 90, 95, 98, 99.0, 99.1, 99.2, 99.3, or 99.4 wt %, to a high of 96, 97, 98.1, 98, 98.2, 98.3, 98.4, 98.5, 98.6, 98.7, 98.8, 98.9, 99.0, 99.1, 99.2, 99.3, 99.4, 99.5, 99.6, 99.7, 99.8, or 99.9 wt %, with ranges from any foregoing low value to any foregoing high value contemplated, provided the high is greater than the low). For instance, the polyethylene composition may include 95, 98, 98.5, 99, 99.1, 99.2, or 99.3 to 99.9 wt % ethylene-derived units. Comonomer units (e.g., $C_2$ to $C_{20}$ α-olefin-derived units, such as units derived from butene, hexene, and/or octane) may be present in the polyethylene composition within the range from a low of 0.1, 0.2, 0.3, 0.4, 0.5, 0.6, 0.7, 0.8, 0.9, 1.0, 2.0, 3.0, 4.0, or 5.0 wt %, to a high of 0.7, 0.8, 0.9, 1, 1.1, 1.2, 1.3, 1.4, 1.5, 1.6, 1.7, 1.8, 1.9, 2, 3, 4, 5, 10, 15, or 20 wt %, with ranges from any foregoing low values to any foregoing high values contemplated, provided the high is greater than the low value). For instance, the polyethylene composition may include 0.1 wt % to 0.7, 0.8 0.9, 1.0, 1.5, or 5.0 wt % comonomer units.

Several suitable comonomers were already noted, although in various embodiments, other α-olefin comonomers are contemplated. For example, the α-olefin comonomer can be linear or branched, and two or more comonomers can be used, if desired. Examples of suitable comonomers include linear $C_3$-$C_{20}$ α-olefins (such as butene, hexene, octane as already noted), and α-olefins having one or more $C_1$-$C_3$ alkyl branches, or an aryl group. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In some embodiments, comonomers include propylene, 1-butene, 1-pentene, 4-methyl-1-pentene, 1-hexene, 1-octene and styrene.

Polyethylene Composition—Molecular Characteristics

A polyethylene composition according to various embodiments can have a density of 0.930 to 0.975 g/cm$^3$, such as 0.938 to 0.965 g/cm$^3$. For example, ethylene polymers may have a density from a low value of 0.935, 0.938, 0.940, 0.945, 0.950, 0.952, 0.953, 0.954, or 0.955 g/cm$^3$ to a high value of 0.957, 0.958, 0.959, 0.960, 0.965, 0.970 or 0.975 g/cm$^3$, with ranges of various embodiments including any combination of any upper or lower value disclosed herein. Density herein is measured according to ASTM D1505-19 (gradient density) using a density-gradient column on a plaque. The plaque is molded according to ASTM D4703-10a, procedure C, and the plaque is conditioned for at least 40 hours at 23° C. to approach equilibrium crystallinity in accordance with ASTM D618-08.

In various embodiments, the polyethylene composition has one or more, two or more, or all of the following molecular weight properties:

- weight-average molecular weight (Mw) of 90,000 to 300,000, such as from a low value of any one of 100,000 g/mol; 110,000 g/mol; 120,000 g/mol; 130,000 g/mol; 140,000 g/mol; 150,000 g/mol; and 160,000 g/mol, to a high value of any one of 160,000 g/mol; 170,000 g/mol; 180,000 g/mol; 190,000 g/mol; 200,000 g/mol; 210,000 g/mol; 225,000 g/mol; 250,000; and 300,000 g/mol. Ranges from any one of the foregoing low values to any one of the high values are contemplated in various embodiments, provided the high value is greater than the low value. For example, Mw can be within the range from 130,000 to 300,000 g/mol in particular embodiments, such as 150,000 g/mol to 180,000; 200,000; 225,000; or 250,000 g/mol.
- number-average molecular weight (Mn) generally within the range from 5,000 to 30,000, such as from a low value of any one of 5,000 g/mol; 6,000 g/mol; 7,000 g/mol; 8,000 g/mol; 9,000 g/mol, to a high value of any one of 10,000 g/mol; 11,000 g/mol; 12,000 g/mol; 13,000 g/mol; 14,000 g/mol; 15,000 g/mol; 17,500 g/mol; 20,000 g/mol; 22,500 g/mol; 25,000 g/mol; 27,500 g/mol; and 30,000 g/mol. Ranges from any one of the foregoing low values to any one of the high values are contemplated in various embodiments (for instance, Mn may be 15,000 g/mol to 30,000 g/mol, such as 16,000 or 20,000 g/mol to 30,000 or 25,000 g/mol). More generally, in some embodiments, Mn may be 30,000 g/mol or less, such as 25,000 g/mol or less.
- Z-average molecular weight (Mz) of 700,000 to 3,000,000 g/mol, such as from a low value of any one of 700,000 g/mol; 800,000 g/mol; 900,000 g/mol; 1 million g/mol; 1.1 million g/mol; 1.2 million g/mol; 1.3 million g/mol; 1.4 million g/mol; 1.45 million g/mol; 1.5 million g/mol; 1.55 million g/mol; and 1.6 million g/mol, to a high value of any one of 1.65 million g/mol; 1.7 million g/mol; 1.75 million g/mol; 1.8 million g/mol; 1.85 million g/mol; 1.9 million g/mol; 1.95 million g/mol; 2 million g/mol; 2.5 million g/mol; 2.75 million g/mol; and 3 million g/mol. Ranges from any one of the foregoing low values to any one of the high values are contemplated in various embodiments (for instance, Mz may be 1 million to 3 million g/mol, such as 1.5 million to 3 million g/mol; or 1.5 million to 2 million g/mol, such as 1.6 million to 1.65 million g/mol). In particular embodiments, Mz may be at least 1 million g/mol, such as at least 1.5 million g/mol, or at least 1.6 million g/mol.

Furthermore, polyethylene compositions in accordance with various embodiments may have an Mw/Mn value (sometimes also referred to as polydispersity index (PDI) or molecular weight distribution (MWD)) of 8, 9, 9.5, 10, 12, 12.5, 15, or 16 to 10.5, 11, 12, 12.5, 13, 14, 15, 16, 17, 18, 19, or 20 (with ranges from any low value to any high value contemplated, such as Mw/Mn from 9 to 12, or 10 to 11). In some embodiments, an Mz/Mw ratio of the polyethylene compositions of various embodiments can be 5, 6, 7, 8, or 9 to 7.5, 8, 9, 10, 11, 12, 13, 14, or 15 (with ranges from any low value to any high value contemplated, such as Mz/Mw of 5 to 8, such as 7 to 7.5, alternatively 8 to 11, such as 9 to 10). An Mz/Mn ratio (indicating the broadness of the overall distribution of molecular weights among chains within the polymer by considering the two characteristic values of very high molecular-weight chains (Mz) and very low molecular-weight chains (Mn)) may be 50, 60, 65, 70, 75, 80, 85, 90, 95 to 75, 80, 85, 90, 95, 100, 105, 110, 115, 120 (with ranges from any low value to any high value contemplated, such as Mz/Mn of 65 to 80, such as 70 to 75, alternatively 90 to 110, such as 95 to 100). In some embodiments, an Mz/Mw ratio may be at least 7, 8, 9, or 10. Similarly, in some embodiments, Mz/Mn ratio may be at least 65, 70, 80, 90, or 95.

Furthermore, as noted, the polyethylene compositions of various embodiments described herein exhibit unimodal molecular weight distribution, meaning that there is a single distinguishable peak in a molecular weight distribution curve of the composition (as determined using gel permeation chromatography (GPC) or other recognized analytical technique, noting that if there is any conflict between or among analytical techniques, a molecular weight distribution determined by GPC, as described below, shall control). Examples of "unimodal" molecular weight distribution can be seen in U.S. Pat. No. 8,691,715, FIG. 6 of such patent, which is incorporated herein by reference. This is in contrast with a "multimodal" molecular weight distribution, which means that there are at least two distinguishable peaks in a molecular weight distribution curve (again, as determined by GPC or any other recognized analytical technique, with GPC controlling in the event of any conflict). For example, if there are two distinguishable peaks in the molecular weight distribution curve such composition may be referred to as bimodal composition. For example, FIGS. 1-5 of U.S. Pat. No. 8,691,715 illustrate representative bimodal molecular weight distribution curves. In these figures, there is a valley between the peaks, and the peaks can be separated or deconvoluted. Often, a bimodal molecular weight distribution is characterized as having an identifiable high molecular weight component (or distribution) and an identifiable low molecular weight component (or distribution). Bimodal Polyethylene also refers the compositions made from staged reactors or using mixed catalysts in a single reactor to produce a blend of 2 different compositions, even though the GPC of the blend may appear to have only one peak. Thus, unless indicated otherwise herein, the term "unimodal" when used in connection with a polyethylene composition, means (1) that the composition is made using a single reaction stage (or multiple parallel reaction stages operating under substantially similar conditions, such that the resulting blend is of two or more like components) and without mixed catalysts; and (2) that the composition exhibits a single peak in GPC analysis.

Polyethylene compositions in accordance with various embodiments can have a g' value equal to or greater than 0.6, 0.65, or 0.7. For instance, g' may be 0.55, 0.6, 0.65, or 0.7 to 0.75, 0.8, 0.85, 0.9 (with ranges from any of the foregoing low values to any of the foregoing high values contemplated, such as 0.6 to 0.8, or 0.7 to 0.75).

The distribution and the moments of molecular weight (Mw, Mn, Mz, Mw/Mn, Mz/Mn, etc.), the monomer/comonomer content ($C_2$, $C_4$, $C_6$ and/or $C_8$, and/or others, etc.) and the g' are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 µm Mixed-B LS columns are used to provide polymer separation. Detailed analytical principles and methods for molecular weight determinations are described in paragraphs [0044]-[0051] of PCT Publication WO2019-246069A1, which are herein incorporated by reference (noting that the equation c=/// referenced in Paragraph [0044] therein for concentration (c) at each point in the chromatogram, should properly read $c=\beta I$, where $\beta$ is mass constant and I is the baseline-subtracted IR5 broadband signal intensity (I)). Unless specifically mentioned, all the molecular weight moments used or mentioned in the present disclosure are determined according to the light-scattering, otherwise known as the "absolute", determination method (e.g., as referenced in Paragraph [0048] of WO2019-246069A1, noting that w2 is 0 for polyethylene homopolymer, such that dn/dc=0.1048). Where otherwise specifically mentioned as the "conventional" method, or IR molecular weight, determination is according to the description of Paragraphs [0044]-[0045] of the just-noted publication, noting that for the equation in such Paragraph [0044], a=0.695 and K=0.000579(1−0.75 Wt) are used, where Wt is the weight fraction for hexane comonomer (i.e., 0 for homopolymer, such that K=0.000579), and further noting that comonomer composition, if any, is determined by the ratio of the IR5 detector intensity corresponding to $CH_2$ and $CH_3$ channel calibrated with a series of PE and PP homo/copolymer standards whose nominal values are predetermined by NMR or FTIR (providing methyls per 1000 total carbons ($CH_3$/1000 TC)) as noted in Paragraph [0045] of the just-noted PCT publication).

Finally, g' is obtained in accordance with the methods described in Paragraphs [0048]-[0051] of PCT Publication WO2019/246069A1.

Other Rheological Properties

In various embodiments, the polyethylene compositions have a melt index, (MI, also referred to as $I_2$ or $I_{2.16}$ in recognition of the 2.16 kg loading used in the test) of 0.1 g/10 min to 5 g/10 min, such as from a low of any one of 0.1, 0.2, 0.25, and 0.3 g/10 min, to a high of 0.5, 0.55, 0.6, 0.65, 0.7, 0.75, 1, 1.2, 1.5, 1.7, 2, 2.5, 3, 4, 5, or 10 g/10 min, with ranges from any of the foregoing low values to any of the foregoing high values contemplated herein) (e.g., 0.1 to 1 g/10 min, alternatively 2 to 4 g/10 min, such as 2 to 3 g/10 min or 2.5 to 3 g/10 min). It is noted that MI according to some preferred embodiments is 2.0 g/10 min or greater (e.g., 2 to 3, 4, or 5 g/10 min); or greater than 2.0 g/10 min.

Moreover, polyethylene compositions of various embodiments can have a high load melt index (HLMI) (also referred to as 121 or 121.6 in recognition of the 21.6 kg loading used in the test) of a low of 20, 25, 28, 29, 30, or 31 g/10 min to a high of 35, 36, 37, 38, 39, 40, 45, 50, 60, 70, or 75 g/10 min; with ranges from any of the foregoing lows to any of the foregoing highs contemplated herein (e.g., 15 to 30 g/10 min, such as 20 to 25 g/10 min). Alternatively, and more preferably, polyethylene compositions of various embodiments can have a high load melt index (HLMI) of a low of 70, 75, 80, 85, or 90 g/10 min to a high of 95, 100, 105, or 110 g/10 min; with ranges from any of the foregoing lows to any of the foregoing highs contemplated herein (e.g., 80 to 100 g/10 min, such as 90 to 95 g/10 min).

MIR and Mw/Mn values provide information about the molecular weight distribution of the polymer chains that make up the polymer composition. However, MIR tends to be more sensitive to features of the polymer chains that impact the composition's rheology; and Mw and Mn as determined by GPC, on the other hand, are not so sensitive to rheological features of the polymer chains. Polyethylene compositions according to various embodiments may have a melt index ratio (MIR, defined as $I_{21.6}/I_{2.16}$) of a low of any one of 10, 15, 20, 25, 30, or 35 to a high of 35, 40, 45, 50, or 55; with ranges from any of the foregoing lows to any of the foregoing highs contemplated herein (e.g., 15 to 45, such as 30 to 35).

Melt index (2.16 kg) and high-load melt index (HLMI, 21.6 kg) values can be determined according to ASTM D1238-13 procedure B, such as by using a Gottfert MI-2 series melt flow indexer. For MI, HLMI, and MIR values reported herein, testing conditions were set at 190° C. and 2.16 kg (MI) and 21.6 kg (HMLI) load. An amount of 5 g to 6 g of sample is loaded into the barrel of the instrument at 190° C. and manually compressed. Afterwards, the material is automatically compacted into the barrel by lowering all available weights onto the piston to remove all air bubbles. Data acquisition is started after a 6 min pre-melting time. Also, the sample is pressed through a die of 8 mm length and 2.095 mm diameter.

In various embodiments, the polyethylene composition exhibits shear-thinning rheology, meaning that for increasing shear rates, viscosity decreases. But, advantageously, even at low shear rates (less than 1 rad/s, such as less than 0.5 rad/s, such as at 0.1 and 0.01 rad/s), the complex viscosity of the polyethylene compositions of such embodiments is relatively low. This rheology indicates good processability for the polyethylene compositions in accordance with such embodiments (insofar as the shear rates simulate the viscosity that the composition may exhibit when processed in extruders or similar equipment). Accordingly, a polyethylene composition according to various embodiments may exhibit one or more, such as two or more, or even all, of the following rheological properties:

- Degree of shear thinning, DST, within the range from a low of 0.7, 0.75 or 0.85, to a high of 0.85, 0.9 or 0.95, with ranges from any foregoing low to any foregoing high contemplated herein (e.g., 0.75 to 0.90). DST is a measure of shear-thinning rheological behavior (decreasing viscosity with increasing shear rate), defined as DST=[η*(0.01 rad/s)−η*(100 rad/s)]/η*(0.01 rad/s), where η*(0.01 rad/s) and η*(100 rad/s) are the complex viscosities at 0.01 and 100 rad/s, respectively.
- Complex viscosity (at 628 rad/s, 190° C.) of 800, 700, 600, 500, or 450 Pa*s or less; such as within the range of a low of 200, 250, 300, 350, 400, 450, 500, or 550 Pa*s to a high of 300, 350, 400, 450, 500, 550, 600, 650, 700, 750, or 800 Pa*s, with ranges from any of the foregoing low values to any of the foregoing high values contemplated in various embodiments (provided the high value is greater than the low value) (e.g., 500 to 600 Pa*s, or alternatively, and in some embodiments preferably, 300 to 400 Pa*s).
- Complex viscosity (at 100 rad/s, 190° C.) of 3,000 Pa*s or less; such as 2,000 Pa*s or less; 1,900 Pa*s or less; 1,800 Pa*s or less; or 1,500 Pa*s or less; such as a low of 600; 700; 800; 900; 1,000; 1,200; 1,300; or 1,350 to a high of 1,000; 1,100; 1,200; 1,300; 1,400; 1,500; 1,750; 2,000; 2,250; 2,500; 2,750; or 3,000 Pa*s, with ranges from any low value to any high value contemplated herein (provided the high value is greater than the low value) (e.g., 1,500 to 1,700 Pa*s, alternatively and in some embodiments, preferably, 900 to 1,100 Pa*s).
- Complex viscosity (at 0.01 rad/s, 190° C.) of 100,000 Pa*s or less; such as 50,000 Pa*s or less; or 30,000 Pa*s or less; 10,000 Pa*s, or 5,000 Pa*s or less; or in some cases a low of 1,000; 3,000; 4,000; 5,000; 10,000; 12,000; or 15,000 Pa*s to a high of 40,000; 30,000; 20,000; 18,000; 16,000; 12,000; 10,000; 8,000; or 6,000 Pa*s, with ranges from any low value to any high value contemplated herein (provided the high value is greater than the low value) (e.g., 12,000 to 18,000 Pa*s, alternatively and in some embodiments, preferably, 4,000 to 6,000 Pa*s).

Rheological data such as complex viscosity can be determined using SAOS (small amplitude oscillatory shear) testing. SAOS experiments is performed at 190° C. using a 25 mm parallel plate configuration on an ARES-G2B (TA Instruments). Sample test disks (25 mm diameter, 1.5 mm thickness) can be made with a Carver Laboratory press at 190° C. Samples are allowed to sit without pressure for approximately 5 minutes in order to melt and then held under pressure typically for 3 minutes to compression mold the sample. The disk sample is first equilibrated at 190° C. for about 10 minutes between the parallel plates in the rheometer to erase any prior thermal and crystallization history. An angular frequency sweep is next performed with a typical measurement gap of 1.5 mm from 628 rad/s to 0.01 rad/s angular frequency using 5 points/decade and a strain value within the linear viscoelastic region determined from strain sweep experiments (see C. W. Macosko, Rheology Principles, Measurements and Applications, Wiley-VCH, New York, 1994). All experiments are performed in a nitrogen atmosphere to minimize any degradation of the sample during the rheological testing.

In order to quantify the shear thinning rheological behavior, which is defined as the decrease of the viscosity at the increase of frequency or shear rate, the degree of shear thinning (DST) parameter is measured by the following expression:

$$DST = [\eta*(0.01\ \text{rad}/s) - \eta*(100\ \text{rad}/s)]/\eta*(0.01\ \text{rad}/s)$$

where η*(0.01 rad/s) and η*(100 rad/s) are the complex viscosities at 0.01 and 100 rad/s, respectively.

The complex viscosity |η*(ω)| versus frequency (ω) data obtained for the SAOS experiment is fitted using the Carreau-Yasuda (CY) model to obtain the zero shear viscosity Eta0. The TA instrument TRIOS software may be used for convenience. The Carreau Yasuda model below, where ηo is the zero shear viscosity (e.g., viscosity where frequency=0), k is the consistency (characteristic time), n is the power law index and a parameter that describes the transition between Newtonian plateau and power law region. $\eta_{oo}$ is the infinite viscosity and fixed at 0. Finally, a is the "breadth" parameter, sometimes referred to as the CY-a parameter.

$$\frac{\eta - \eta_\infty}{\eta_o - \eta_\infty} = [1 + (k\dot{\gamma})^a]^{\frac{n-1}{a}}$$

Other Physical Properties

The polyethylene compositions of various embodiments may also, or instead, exhibit one or more, two or more, or even all of the following properties:

- Yield strength in the machine direction (MD) (according to ASTM D882) of a low of 3,800; 3,900; 4,000; 4,100;

4,200; 4,300; or 4,400 psi to a high of 4,000; 4,500; 4,600; 4,700; 4,800; 4,900; or 5,000 psi, with ranges from any of the foregoing lows to any of the foregoing highs contemplated (e.g., 4,300 to 4,400 psi, alternatively 4,500 to 4,600 psi). Yield strength in the transverse direction (TD) (according to ASTM D882) of a low of 4,000; 4,200; 4,400; 4,600; 4,800; 5,000; or 5,200 psi to a high of 7,000; 6,500; 6,000; 5,900; 5,800; 5,700; 5,600; 5,500; 5,400; 5,300; 5,200; or 5,100 psi, with ranges from any of the foregoing lows to any of the foregoing highs contemplated (e.g., 5,400 to 5,500 psi, alternatively and in some embodiments preferably 5,000 to 5,200 psi).

Tensile strength in the machine direction (MD) (according to ASTM D882) of a low of 5,000; 5,500; 5,800; 6,000; 7,000; 8,000; 9,000 or 10,000 psi to a high of 15,000; 13,000; 11,000; 10,000; 9,000; 8,000; 7,000; 6,500; or 6,000 psi, with ranges from any of the foregoing lows to any of the foregoing highs contemplated (e.g., 10,000 to 11,000 psi, alternatively and in some embodiments preferably 6,000 to 7,000 psi). Tensile strength in the transverse direction (TD) (according to ASTM D882) of a low of 4,000; 4,200; 4,400; 4,600; 4,800; 5,000; or 5,200 psi to a high of 7,000; 6,500; 6,000; 5,900; 5,800; 5,700; 5,600; 5,500; 5,400; 5,300; 5,200; or 5,100 psi, with ranges from any of the foregoing lows to any of the foregoing highs contemplated (e.g., 5,400 to 5,500 psi, alternatively and in some embodiments preferably 5,000 to 5,200 psi).

Flexural 1% secant modulus in the machine direction (MD) (according to ASTM D882) of a low of 120,000; 130,000; 135,000; 140,000; 145,000; or 150,000 pounds per square inch (psi) to a high of 200,000; 190,000; 180,000; 175,000; 170,000; 165,000; 160,000; 155,000; or 150,000 psi, with ranges from any of the foregoing lows to any of the foregoing highs contemplated (e.g., 140,000 to 160,000 psi, or 145,000 to 150,000 psi). Flexural 1% secant modulus in the transverse direction (TD) (according to ASTM D882) of a low of 150,000; 170,000; 190,000; 200,000; 210,000; or 220,000 pounds per square inch (psi) to a high of 300,000; 250,000; 240,000; 230,000; 220,000; 210,000; or 200,000 psi, with ranges from any of the foregoing lows to any of the foregoing highs contemplated (e.g., 220,000 to 230,000 psi, alternatively and in some embodiments preferably 190,000 to 200,000 psi).

Nucleating Agents

Polyethylene compositions of the present disclosure can be used as films for food packaging applications. For example, the food packaging industry has a need for improved polyethylene compositions that can be converted into packaging films that have improved (reduced) water vapor transmission rate (WVTR). Low WVTR packaging film ensures, for example, that crackers are crispy when opened by the consumer. In addition, low WVTR films can ensure that the packaged food has an acceptable shelf-life.

Blending of nucleating agents with polyethylene compositions is conventionally effective in reducing the WVTR of barrier films. Nonetheless, the addition of nucleating agents to polyethylene compositions of the present disclosure is merely optional. The term "nucleating agent" refers to a material that effectively accelerates the phase change from a molten olefin interpolymer product to a solid semi-crystalline olefin interpolymer product. Non-limiting examples of techniques to quantify the efficacy of the nucleating agent include, lower half times of crystallization as measured using a differential scanning calorimeter or measuring the reduction in crystal size as measured using an optical microscope. Nucleating agents may include commercial nucleating agents such as HPN-20E (available from Milliken & Company, Spartanburgh, S.C., USA); according to Milliken patent U.S. Pat. No. 7,659,336 B2, HPN-20E employs an organic calcium metal salt, and 1,000 ppm or 2,000 ppm loading level might be used.

Polyethylene compositions (and blends thereof and films thereof) of the present disclosure can have a nucleating agent content of 2,000 ppm or less, such as 1,500 ppm or less, such as 1,000 ppm or less, such as 500 ppm or less, such as 250 ppm or less, such as 100 ppm or less, such as 10 ppm or less, such as 0 ppm. In some embodiments, a polyethylene composition (or blend thereof or film thereof) has a nucleating agent content of 1 ppm to 1,000 ppm, such as 1 ppm to 500 ppm, such as 1 ppm to 250 ppm, such as 1 ppm to 100 ppm, such as 1 ppm to 10 ppm, or 0 ppm. In some preferred embodiments, nucleating agent is present at 100 ppm or less, more preferably 10 ppm or less, such as 0 ppm. A nucleating agent may be considered "absent" from the polyethylene composition or film (or equivalently, the composition or film may be "devoid" of nucleating agent) at 0 ppm nucleating agent; and a nucleating agent may be "substantially absent" or the film/composition "substantially devoid" of nucleating agent at 100 ppm or less nucleating agent, preferably 10 ppm or less.

Methods of Making Polyethylene Compositions

The present disclosure relates to polymerization processes where monomer (such as ethylene), and optionally comonomer, are contacted with a catalyst. Suitable monomers and comonomers are per the discussion above.

Polymerization processes of the present disclosure may be carried out in any suitable manner. Any suitable suspension, homogeneous, bulk, solution, slurry, or gas phase polymerization process may be used. Such processes can be run in a batch, semi-batch, or continuous mode. A homogeneous polymerization process is defined to be a process where at least about 90 wt % of the product is soluble in the reaction medium. A bulk process is defined to be a process where monomer concentration in all feeds to the reactor is 70 volume % or more. Alternately, no solvent or diluent is present or added in the reaction medium, (except for the small amounts used as the carrier for the catalyst system or other additives, or amounts typically found with the monomer; e.g., propane in propylene).

In some embodiments, the process is a slurry polymerization process, such as a continuous slurry loop polymerization reaction process. A single slurry loop reactor may be used, or multiple reactors in parallel or series (although, to achieve the unimodal molecular weight distribution in accordance with various embodiments, as discussed previously, it can be preferable that either a single reactor is used, or that the same catalyst, feed, and reaction conditions are used in multiple reactors, e.g., in parallel, such that the composition is considered made in a single reactive step). As used herein, the term "slurry polymerization process" means a polymerization process in which a supported catalyst is used and monomers are polymerized on the supported catalyst particles within a liquid medium (comprising, e.g., inert diluent and unreacted polymerizable monomers), such that a two phase composition including polymer solids and the liquid circulate within the polymerization reactor. Typically, a slurried tank or slurry loop reactor may be used. In some embodiments herein, a slurry loop reactor is used. In such processes the reaction diluent, dissolved monomers, and catalyst are circulated in a loop reactor in which the pressure of the polymerization reaction is relatively high.

The produced solid polymer is also circulated in the reactor. A slurry of polymer and the liquid medium may be collected in one or more settling legs of the slurry loop reactor from which the slurry is periodically discharged to a flash chamber wherein the mixture is flashed to a comparatively low pressure. As an alternative to settling legs, in other examples, a single point discharge method may be used to move the slurry to the flash chamber. The flashing results in substantially complete removal of the liquid medium from the polyethylene composition, and the vaporized polymerization diluent (e.g., isobutane) is then recompressed in order to condense the recovered diluent to a liquid form suitable for recycling as liquid diluent to the polymerization zone. The cost of compression equipment and the utilities required for its operation often amounts to a significant portion of the expense involved in producing polyethylene compositions.

Slurry polymerization processes suitable for achieving such embodiments can be based on those described in, e.g., U.S. Pat. No. 6,204,344, col. 8, line 30 to col. 9, line 48 & FIG. 1, which portions are incorporated by reference herein; the entirety of the '344 patent is incorporated by reference herein in jurisdictions where such incorporation is permitted. More generally, the '344 patent describes an embodiment of a slurry polymerization system that includes a two-stage flash system for diluent recovery and recycling and associated methods for diluent recovery and recycling. The '344 patent discloses, inter alia, an apparatus for continuously recovering polymer solids from a polymerization effluent comprising a slurry of said polymer solids in a liquid medium comprising an inert diluent and unreacted monomers, which apparatus may be employed in embodiments in accordance with the present disclosure (although other slurry polymerization systems and apparatus may just as well be employed in accordance with various other embodiments). The apparatus described in the '344 patent includes a discharge valve on a slurry reactor, examples of which include slurry loop reactors and stirred tank slurry reactors, for the continuous discharge of a portion of the slurry reactor contents into a first flash tank. The first flash tank operates at a pressure and slurry temperature such that a substantial portion of the liquid medium will be vaporized and the inert diluent component of said vapor is condensable, without compression, by heat exchange with a fluid. The first flash tank is in fluid communication with a second flash tank via a pressure seal that allows plug flow of a concentrated slurry into a second flash tank that operates at a temperature of the concentrated polymer solids/slurry and pressure such that any remaining inert diluent and/or unreacted monomer will be vaporized and removed overhead for condensation by compression and heat exchange and the polymer solids are discharged from the bottom of said second flash tank for additional processing or storage. A complete polymer production plant will include a number of these and other components (e.g., components for handling solids, liquids and gases, such as but not limited to separator systems such as cyclones and accumulator drums; pumps; sensors or meters of flow, pressure, and/or temperature; and the like).

The liquid diluent employed in the polymerization medium is typically an alkane having from 3 to 7 carbon atoms. The medium employed should be liquid under the conditions of polymerization and relatively inert. In some embodiments, a branched alkane can be a preferred diluent. In further embodiments, a hexane or an isobutane diluent is employed. More generally, suitable diluents/solvents for polymerization include non-coordinating, inert liquids. Non-limiting examples of diluents/solvents generally include straight and branched-chain hydrocarbons, such as isobutane, butane, pentane, isopentane, hexane, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents also include liquid olefins which may act as monomers or comonomers including, but not limited to, ethylene, propylene, 1-butene, 1-hexene, 1-pentene, 3-methyl-1-pentene, 4-methyl-1-pentene, 1-octene, 1-decene, and mixtures thereof. In some embodiments, aliphatic hydrocarbon solvents are used as the solvent, such as isobutane, butane, pentane, isopentane, hexane, isohexane, heptane, octane, dodecane, or mixtures thereof; cyclic and alicyclic hydrocarbons, such as cyclohexane, cycloheptane, methylcyclohexane, methylcycloheptane, or mixtures thereof.

Polymerization processes may be run at any temperature and/or pressure suitable to obtain the desired polyethylene compositions. In some embodiments, the polyethylene compositions are produced in a slurry reactor (e.g., slurry tank or slurry loop, such as slurry loop) maintained at a temperature of 80 to 110° C., such as 82 to 108° C., 95 to 105° C. or 98 to 103° C., or 95 to 110° C. Reactor pressure may be 425 to 800 psig (2930 to 5516 kPa), such as from 450 to 650 psig (3102 to 4481 kPa); or 500 to 600 psig (3447 to 4137 kPa).

Hydrogen may be added to a reactor for molecular weight control of polyolefins. In at least one embodiment, hydrogen is fed to the polymerization reactor such that it is present in the reactor at a molar concentration of 0.1 to 2.1 mol %, such as 0.1 to 1.0 mol %. In some embodiments, hydrogen is fed to the polymerization reactor such that it is present in the reactor in an amount of 800 ppm to 2,000 ppm, such as 1,000 ppm to 1,200 ppm, alternatively 1,200 ppm to 2,000 ppm, such as 1,400 ppm to 1,800 ppm, such as 1,500 ppm to 1,700 ppm.

Polymerization processes may be run at an ethylene concentration (in the reactor) of 1 wt % to 15 wt %, such as 1 wt % to 10 wt %, such as 1 wt % to 8 wt %, such as 2 wt % to 6 wt %, alternatively 3 wt % to 7 wt %, such as 3 wt % to 5 wt %, such as 3.5 wt % to 4.5 wt %, based on the total weight of contents in the reactor (e.g., catalyst, ethylene monomer, comonomer, diluent, and polymer formed).

Polymerization processes may be run at a comonomer concentration (in the reactor) of 0 wt % or greater, such as 0.01 wt % to 5 wt %, such as 0.1 wt % to 1 wt %, such as 0.1 wt % to 0.5 wt %, such as 0.1 wt % to 0.25 wt %, based on the total weight of contents in the reactor (e.g., catalyst, ethylene monomer, diluent, comonomer, and polymer formed).

A weight percent (wt %) of polymer solids in the polymerization slurry circulating in the polymerization zone in the loop reactor can be greater than 45 wt %, such as 45 wt % to 65 wt %, such as 50 wt % to 65 wt %, such as 55 wt % to 65 wt % based on the weight of the polymerization slurry.

A space time yield (STY), expressed in terms of pounds per hour-gallon (lbs/hr-gal) may be greater than 2.6, such as 2.6 to 4.0, such as 3.3 to 4. As used herein, the term "space time yield" (STY) means the production rate of polymer per unit of loop reactor volume or per unit of polymerization slurry volume.

As used herein, the term "polymer residence time" means the average duration that a polymer particle remains within the loop reactor. Polymerizations of the present disclosure can be performed at a polymer residence time of 0.5 hour to 1.5 hours, such as 0.75 hour to 1.25 hours, such as 0.8 hour to 1 hour.

In some embodiments, the polymerization processes are gas phase polymerization processes. Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. Typically, the gas phase reactor may operate in condensing mode where one or more of the diluents/solvents, as described above, act as an inert condensing agent (ICA) in the fluidized bed reactor for the removal of heat to increase production rates and/or modify polymer properties. See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228.

Catalysts

As noted, suitable polymerization processes employ a polymerization catalyst. The catalyst, for example, may include any suitable Ziegler Natta (ZN) catalyst.

The catalyst, for example, may include any ZN transition metal catalyst, such as those catalysts disclosed in Ziegler Catalysts 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525,678; 5,288,933; 5,290,745; 5,093,415 and 6,562,905. Other examples of ZN catalysts are discussed in U.S. Pat. Nos. 4,115,639; 4,077,904; 4,482,687; 4,564,605; 4,721,763; 4,879,359 and 4,960,741. In general, ZN catalysts include transition metal compounds from Groups 3 to 17, or Groups 4 to 12, or Groups 4 to 6 of the Periodic Table of Elements. As used herein, reference to the Periodic Table of the Elements and groups thereof is to the NEW NOTATION published in Hawley's Condensed Chemical Dictionary, Thirteenth Edition, John Wiley & Sons, Inc., (1997), unless reference is made to the Previous IUPAC form denoted with Roman numerals (also appearing in the same), or unless otherwise noted. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

ZN catalysts may be represented by the formula: MRx, where M is a metal from Groups 3 to 17, such as Groups 4 to 6, such as Group 4, such as titanium; R is a halogen or a hydrocarbyloxy group; and x is the valence of the metal M. Non-limiting examples of R include alkoxy, phenoxy, bromide, chloride and fluoride.

In a class of embodiments, the ZN catalysts may include at least one titanium compound having the formula $Ti(OR)_aX_b$, wherein R is a substituted or unsubstituted hydrocarbyl group, such as a $C_1$ to $C_{25}$ aliphatic or aromatic group; X is selected from Cl, Br, I, and combinations thereof; a is selected from 0, 1 and 2; b is selected from 1, 2, 3, and 4; and a+b=3 or 4. As used herein, "hydrocarbyl" refers to a moiety having hydrogen and carbon atoms.

Non-limiting examples where M is titanium include $TiCl_3$, $TiCl_4$, $TiBr_4$, $Ti(OCH_3)Cl_3$, $Ti(OC_2H_5)_3Cl$, $Ti(C_2H_5)Cl_3$, $Ti(OC_4H_9)_3Cl$, $Ti(OC_3H_7)_2Cl_2$, $Ti(OC_2H_5)_2Br_2$, $Ti(OC_6H_5)Cl_2$, $Ti(OCOCH_3)Cl_3$, $Ti(OCOC_6H_5)Cl_3$, $TiCl_3/3AlCl_3$, $Ti(OC_{12}H_{25})Cl_3$, and combinations thereof.

In a class of embodiments, the ZN catalysts may include at least one magnesium compound. The at least one magnesium compound may have the formula $MgX_2$, wherein X is selected from Cl, Br, I, or combinations thereof. The at least one magnesium compound may be selected from: $MgCl_2$, $MgBr_2$ and $MgI_2$. ZN catalysts based on magnesium/titanium electron-donor complexes are described in, for example, U.S. Pat. Nos. 4,302,565 and 4,302,566. ZN catalysts derived from Mg/Ti/Cl/THF are also contemplated.

In at least one embodiment, a ZN catalyst is titanium chloride on magnesium chloride support.

Still other suitable ZN catalysts are disclosed in U.S. Pat. Nos. 4,124,532; 4,302,565; 4,302,566; 4,376,062; 4,379,758; 5,066,737; 5,763,723; 5,849,655; 5,852,144; 5,854,164 and 5,869,585 and published EP-A2 0 416 815 A2 and EP-A1 0 420 436.

The catalyst may be unsupported or supported on silica, magnesium chloride, or other porous fine grained materials. Generally, silica-supported catalysts may be preferred. Granular catalysts, like Sylopol 5917, may be preferred over a spherical catalyst, like Sylopol 5951, due to the mechanical integrity of the former. In some embodiments, a catalyst is a modified Sylopol 5917 catalyst having an increased particle size. In some embodiments, a catalyst has a particle size, $D_{50}$, of about 10 μm to about 60 μm, such as about 15 μm to about 40 μm, such as about 15 μm to about 35 μm.

It has been discovered that an amount of a cocatalyst can affect the molecular weight distribution of the polyethylene composition of the present disclosure. For example, increasing an amount of triethyl aluminum from 75 ppm to 225 ppm may decrease the melt index ratio and increase the Mz/Mw value of a polyethylene composition.

As described herein, the amount of cocatalyst in ppm refers to the parts per million of cocatalyst as a concentration relative to diluent only and is based on the cocatalyst in the diluent measured in the diluent feed that introduces the cocatalyst and diluent into the reactor (as opposed to the content of cocatalyst within the reactor itself), particularly in the context of slurry polymerization processes in which diluent (e.g., isobutane) is used. Accordingly, in some embodiments, the cocatalyst can be introduced into the reactor with diluent and with or without catalyst, but the ppm values of cocatalyst remain consistent regardless of how the cocatalyst is introduced into the reactor. Equivalently, cocatalyst may be introduced independently of diluent (and furthermore may be controlled to be within certain ratios relative to ethylene feed, or production rate, or some other parameter), but the skilled artisan will readily be able to calculate an equivalent amount of cocatalyst introduced in such a manner, as if the cocatlyst were introduced to the reactor with the diluent (and/or as a ratio or concentration on the basis of diluent).

In some embodiments, a polymerization is performed with an amount of cocatalyst independently of 10 ppm to 1,000 ppm, such as 30 ppm to 500 ppm, such as 30 ppm to 150 ppm, such as 50 ppm to 100 ppm, such as 70 ppm to 80 ppm, alternatively 100 ppm to 500 ppm, such as 150 ppm to 350 ppm, such as 200 ppm to 250 ppm or 200 ppm to 300 ppm. Cocatalyst concentration in diluent (or equivalent amount of cocatalyst introduced to the reactor) are also contemplated to be within the range from any foregoing low end to any foregoing high end, provided the high is greater than the low; with amounts greater than 100 ppm, such as within the range from 200 ppm to 250, 300, 350, 400, 450, or 500 ppm preferred. In some embodiments, the cocatalyst is of the formula $AlR_3$ (where each R is, independently, a $C_1$-$C_8$ aliphatic radical). In some embodiments, each instance of R of $AlR_3$ is ethyl.

Blends

The present disclosure also provides blends of the polyethylene composition(s) prior to being formed into a film, molded part or other article. The blends may optionally include one or more additional polymers. For example, additional polymers may include a polyethylene, an isotactic polypropylene, a highly isotactic polypropylene, a syndiotactic polypropylene, a random copolymer of propylene and ethylene, and/or butene, and/or hexene, polybutene, ethylene vinyl acetate, low density polyethylene (LDPE), linear low density polyethylene (LLDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, ethylene propylene diene monomer (EPDM) polymer, block copolymer, styrenic block copolymers, polyamides, polycarbonates, polyethylene terephthalate (PET) resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, polyisobutylene, or combination(s) thereof.

An additional polymer may be obtained from a post-consumer recycled (PCR) polymer material, and/or, similarly, a post-industrial recycled (PIR) polymer material.

In at least one embodiment, the polyethylene composition is present in the above blends at 10 wt % to 99 wt %, based upon the weight of the polymers in the blend, such as 20 wt % to 95 wt %, such as 30 wt % to 90 wt %, such as 40 wt % to 90 wt %, such as 50 wt % to 90 wt %, such as 60 wt % to 90 wt %, such as 70 to 90 wt %, such as 80 to 90 wt %, alternatively 90 to 99 wt %, such as 92 to 98 wt %.

The blends described above may be produced by mixing the polymers (and optional additives) of the present disclosure with one or more polymers (as described above), by connecting reactors together in series or in parallel to make reactor blends or by using more than one catalyst in the same reactor to produce multiple species of polymer.

Alternatively, the blends may be post-reactor blends, wherein the polymers (and optional additives) can be mixed together prior to being put into an extruder or may be mixed in the extruder. Such blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder.

Additionally, additives may be included in a (reactor or post-reactor) blend, in one or more components of the blend, and/or in a product formed from the blend, such as a film, as desired. Such additives can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; or combination(s) thereof.

Films and Other End Uses

A polyethylene composition of the present disclosure (and/or a blend comprising the polyethylene composition) can be useful in forming various articles, including but not limited to films (monolayer or multilayer, formed by extrusion, co-extrusion, casting, and/or lamination), sheet, and fiber extrusion and co-extrusion; as well as gas-assisted injection molding, extrusion blow molding, injection blow molding, injection stretch blow molding, compression molding, rotational molding, foam molding, thermoforming, sheet extrusion, profile extrusion, machine direction orientation (MDO) polyethylene and biaxial oriented polyethylene (BOPE) films, etc.

Film applications may include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. For example, the films can be oriented in the Machine Direction (MD) at a ratio of up to 15, such as from about 5 to about 7, and in the Transverse Direction (TD) at a ratio of up to 15, such as from about 7 to about 9. However, in another embodiment the film is oriented to the same extent in both the MD and TD directions.

The films may vary in thickness depending on the intended application; however, films of a thickness from 1 μm to 50 μm, such as 1 μm to 25 μm, such as 1 μm to 12 μm, can be suitable. Films intended for packaging can be from 10 μm to 50 μm thick. The thickness of the sealing layer can be from 0.2 μm to 50 μm. There may be a sealing layer on both the inner and outer surfaces of the film or the sealing layer may be present on only the inner or the outer surface.

To facilitate discussion of different film structures, the following notation is used herein. Each layer of a film is denoted "A" or "B". Where a film includes more than one A layer or more than one B layer, one or more prime symbols (', ", ''', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted A/B/A'. Similarly, a five-layer film of alternating layers would be denoted A/B/A'/B'/A". Unless otherwise indicated, the left-to-right or right-to-left order of layers does not matter, nor does the order of prime symbols; e.g., an A/B film is equivalent to a B/A film, and an A/A'/B/A" film is equivalent to an A/B/A'/A" film, for purposes described herein. The relative thickness of each film layer is similarly denoted, with the thickness of each layer relative to a total film thickness of about 100 (dimensionless) indicated numerically and separated by slashes; e.g., the relative thickness of an A/B/A' film having A and A' layers of about 10 μm each and a B layer of about 30 μm is denoted as 20/60/20.

In some embodiments, and using the nomenclature described above, the present disclosure provides for multilayer films with any of the following exemplary structures: (a) two-layer films, such as A/B and B/B'; (b) three-layer films, such as A/B/A', A/A'/B, B/A/B' and B/B'/B"; (c) four-layer films, such as A/A'/A"/B, A/A'/B/A", A/A'/B/B', A/B/A'/B', A/B/B'/A', B/A/A'/B', A/B/B'/B", B/A/B'/B" and B/B'/B"/B'"; (d) five-layer films, such as A/A'/A"/A'"/B, A/A'/A"/B/A'", A/A'/B/A"/A'", A/A'/A"/B/B', A/A'/B/A"/B', A/A'/B/B'/A", A/B/A'/B'/A", A/B/A'/A"/B, B/A/A'/A"/B', A/A'/B/B'/B", A/B/A'/B'/B", A/B/B'/B"/A', B/A/A'/B'/B", B/A/B'/A'/B", B/A/B'/B"/A', A/B/B'/B"/B'", B/A/B'/B"/B'", B/B'/A/B"/B'", and B/B'/B"/B'"/B""; and similar structures for films having six, seven, eight, nine, twenty-four, forty-eight, sixty-four, one hundred, or any other number of layers. It should be appreciated that films can have still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and any other suitable material.

In another embodiment, one or more layers may be modified by corona treatment, electron beam irradiation, gamma irradiation, flame treatment, or microwave. In at least one embodiment, one or both of the surface layers is modified by corona treatment.

In at least one embodiment, the polyethylene composition (or blend thereof) can be 2 to 100 wt %, such as 20 90 wt %, such as 30 to 80 wt % of the film. A monolayer or multilayer film containing the inventive composition may be pre-formed by using a blown film extrusion line. The operation of a blown film line is known to skilled persons in the art. The thickness of the film depends on the final film target thickness and the draw ratio of machine direction orientation (MDO) process. The thickness may be from 2 to 50 mils, such as 3 to 20 mils, such as 4 to 10 mils. The draw ratio machine direction orientation stretch can be at least 1:2 up to 1:15, such as 1:4 to 1:10, such as 1:5 to 1:7. When the draw ratio is 1:6, the thickness of the film is about 6 times less than the original thickness. The films should be heated when performing stretching. The temperature could be from 110° C. to 135° C., such as 118° C. to 125° C. Stretching may be achieved by different approaches and equipment known to skilled person in the art. One non-limiting example is differential speed rolls. MDO stretched films, for example, can have a very unique combination of properties. For example, a 1 mil MDO film obtained by 1:6 stretch ratio, containing about 76% of HDPE in this disclosure, would typically have MD and TD modulus greater than or equal to 200K psi; haze less than 8%, such as less than 5%, and WVTR per ASTM 1249 less than 6 g*day/m$^2$/mil, preferably 0.5-3 g*day/m$^2$/mil.

In some embodiments, biaxially oriented high density polyethylene films can be formed. In one example, sheets or films comprising a polyethylene composition of the present disclosure are extruded, or melt blended and coextruded, such as through a 3, 4, 5, 7-layer die head, into the desired preformed film. Film extruders are known to skilled persons in the art, where a screw size may be 100 mm to 400 mm, and length to diameter ratios ranging from 10/1 to 50/1 can be used to melt blend the molten layer materials. The polymer melt exits the die having a die gap(s) of 0.5 to 3 or 4 or 5 or 6 mm. The extruded film is then cooled using air, water, or both to form the un-oriented films. The un-oriented film is consequently reheated to a temperature of 100° C. to 120° C. or 150° C., such as a temperature of 118° C. to 135° C., and then passed between differential speed rolls to achieve machine direction orientation stretch followed by transverse orientation stretch. Examples of MD and TD stretching can be found at U.S. Pat. No. 8,080,294B2, incorporated by reference herein. In some embodiments, the film(s) described herein are biaxially oriented with at least 2 to 8-fold TD orientation and at least a 2 or 3 or 8-fold MD orientation.

Production of Blown Film

Typically a conventional polyolefin composition for blown film applications has an MI of less than 2 (lower MI=higher MW). In order to form blown film, a polyolefin composition is extruded as molten polymer over a circular die and a bubble blows up. The molecular weight of the polyolefin composition should be high enough to form bubble (otherwise there isnt enough stress to form the bubble). In contrast, for cast films, a polyolefin composition should have an MI of 2 to 4 and cannot blow into films (i.e., it needs to be extruded). However, polyolefin compositions of the present disclosure provide a high Mz and a low enough MI such that blown films can be formed, and this can be true even for polyethylene homopolymer compositions with MI above, but near, 2.0 g/10 min (e.g., 2 to 4 g/10 min). Also, the high density of polyolefin compositions of the present disclosure can provide blown films having good barrier properties (e.g., that keep moisture out when used as food packaging).

Blown film extrusion involves the process of extruding the polyethylene composition (or blends thereof) through a die followed by a bubble-like expansion. Advantages of manufacturing film in this manner include: (1) a single operation to produce tubing; (2) regulation of film width and thickness by control of the volume of air in the bubble; (3) high extruder output and haul-off speed; (4) elimination of end effects such as edge bead trim and nonuniform temperature that can result from flat die film extrusion; and (5) capability of biaxial orientation (allowing uniformity of mechanical properties).

As part of the process, a melt comprising the polyethylene composition (or blend thereof) can be mixed with a foaming agent and extruded through an annular slit die to form a thin walled tube. Air can be introduced via a hole in the center of the die to blow up the tube like a balloon. Mounted on top of the die, a high-speed air ring blows onto the hot film to cool it. The foam film can be drawn in an upward direction, continually cooling, until it passes through nip rolls where the tube is flattened to create what is known as a 'lay-flat' tube of film. This lay-flat or collapsed tube can then be taken back down the extrusion tower via more rollers. For high output lines, air inside the bubble may also be exchanged. The lay-flat film can be either wound or the edges of the film are slit off to produce two flat film sheets and wound up onto reels to produce a tube of film. For lay-flat film, the tube can be made into bags, for example, by sealing across the width of film and cutting or perforating to make each bag. This operation can be performed either in line with the blown film process or at a later time. The blown film extrusion process is typically a continuous process.

In coextrusion lines, the number of extruders depends on the number of different materials being extruded and not necessarily on the number of layers. Current feedblock technology allows fluid flow from one extruder to be split into two or more layers in the coextrudate. In an aspect, a coextrusion feedblock arranges the different melt streams in a predetermined layer sequence and generates a melt stream for each layer. Each melt stream then meets its neighboring layers and a final planar coextrudate is formed. The coextrusion feedblock can be fixed or have variable geometry blocks. A flat die, and the synergy between the die and the feedblock, are crucial to high quality film production. The die must spread the coextrudate received from the feedblock while maintaining flatness of the film. The die requires a sufficiently short residence time in order to prevent heat transfer between layers or polymer degradation. The die must also be sufficiently strong so as to resist deformation when subjected to high pressures inherent in thin film processes. In an aspect, the present multilayer films have 7 total layers or fewer, such as 3, 4, 5, 6, or 7 layers. More layers may be employed within the spirit of the present disclosure; for instance, in a more broad aspect, the present multilayer films have 50 total layers or fewer.

Film Properties

In some embodiments, films of the present disclosure are oriented in the Machine Direction (MD) at a draw down ratio of up to 25 and a blow up ratio of 2.5. The films may vary in thickness depending on the intended application; however, films of a thickness from about 1 μm to about 150 μm are usually suitable, such as from 10 μm to 150 μm. Films intended for packaging are usually 10 μm to 70 μm thick and often consisted of co-extruded multilayers.

In at least one embodiment, a film of the present disclosure can have an Elmendorf Tear value (MD), in accordance with ASTM D1922 (with conditioning for 40 hours at 23° C.±2° C. and 50%±10% relative humidity) of 10, 11, or 12 g/mil to 15, 20, 25, 30, 35, or 40 g/mil.

In at least one embodiment, a film of the present disclosure can have an Elmendorf Tear value (TD), in accordance with ASTM D1922 (with conditioning for 40 hours at 23° C.±2° C. and 50%±10% relative humidity) of 800 g/mil to 2000 g/mil, such as 1000 g/mil to 1600 g/mil, such as 1200 g/mil to 1400 g/mil.

In at least one embodiment, a film of the present disclosure can have an Elmendorf Tear ratio (TD/MD) of 70 to 100, such as 80 to 100, such as 85 to 90, alternatively 1 to 25, such as 2 to 15, such as 3 to 10, such as 5 to 8, such as 6 to 8. A low (i.e., "balanced") tear TD/MD ratio is normally considered beneficial. High tear TD/MD typically indicated a film is more orientational and splits easily, i.e., a relatively very low MD tear value. The inventive examples have higher MD tear values.

In at least one embodiment, a film of the present disclosure can have a tensile strength ratio (MD/TD) of 2 or less, such as 1.5 or less, such as 1.4 or less, such as 0.5 to 2, such as 0.5 to 1.5, such as 0.7 to 1.4. A low (i.e., "balanced") tensile MD/TD ratio indicates less MD molecule orientations and higher TD tensile and yield strength.

In at least one embodiment, a film of the present disclosure has an MVTR value of 1 to 25 g-mil/m$^2$/day, such as 10 to 20 g-mil/m$^2$/day, such as 12 to 17 g-mil/m$^2$/day, alternatively 1 to 10 g-mil/m$^2$/day, such as 2 to 8 g-mil/m$^2$/day, such as 4 to 7 g-mil/m$^2$/day, such as 5 to 7 g-mil/m$^2$/day. For MVTR measurements, film samples are cut into 10 cm×10 cm samples and the exposed area for testing is 50 cm$^2$. 5 thickness measurements are made and the average of the 5 measurements is used for the MVTR calculation. Testing is performed at 37.8° C. and the remaining testing procedures are per ASTM F1249.

In at least one embodiment, a film of the present disclosure has a % haze (ASTM D1003-13) of 7% to 30%, such as 10% to 28%, such as 20% to 28%, such as 25% to 28%.

Other Physical Properties

Films of the present disclosure may also or instead exhibit one or more, two or more, or even all of the following properties:

Yield strength in the machine direction (MD) (according to ASTM D882) of a low of 3,800; 3,900; 4,000; 4,100; 4,200; 4,300; or 4,400 psi to a high of 4,000; 4,500; 4,600; 4,700; 4,800; 4,900; or 5,000 psi, with ranges from any of the foregoing lows to any of the foregoing highs contemplated (e.g., 4,300 to 4,400 psi, alternatively 4,500 to 4,600 psi). Yield strength in the transverse direction (TD) (according to ASTM D882) of a low of 4,000; 4,200; 4,400; 4,600; 4,800; 5,000; or 5,200 psi to a high of 7,000; 6,500; 6,000; 5,900; 5,800; 5,700; 5,600; 5,500; 5,400; 5,300; 5,200; or 5,100 psi, with ranges from any of the foregoing lows to any of the foregoing highs contemplated (e.g., 5,400 to 5,500 psi, alternatively 5,000 to 5,200 psi).

Tensile strength in the machine direction (MD) (according to ASTM D882) of a low of 5,000; 5,500; 5,800; 6,000; 7,000; 8,000; 9,000 or 10,000 psi to a high of 15,000; 13,000; 11,000; 10,000; 9,000; 8,000; 7,000; 6,500; or 6,000 psi, with ranges from any of the foregoing lows to any of the foregoing highs contemplated (e.g., 10,000 to 11,000 psi, alternatively 6,000 to 7,000 psi). Tensile strength in the transverse direction (TD) (according to ASTM D882) of a low of 4,000; 4,200; 4,400; 4,600; 4,800; 5,000; or 5,200 psi to a high of 7,000; 6,500; 6,000; 5,900; 5,800; 5,700; 5,600; 5,500; 5,400; 5,300; 5,200; or 5,100 psi, with ranges from any of the foregoing lows to any of the foregoing highs contemplated (e.g., 5,400 to 5,500 psi, alternatively 5,000 to 5,200 psi).

Flexural 1% secant modulus in the machine direction (MD) (according to ASTM D882) of a low of 120,000; 130,000; 135,000; 140,000; 145,000; or 150,000 pounds per square inch (psi) to a high of 200,000; 190,000; 180,000; 175,000; 170,000; 165,000; 160,000; 155,000; or 150,000 psi, with ranges from any of the foregoing lows to any of the foregoing highs contemplated (e.g., 140,000 to 160,000 psi, or 145,000 to 150,000 psi). Flexural 1% secant modulus in the transverse direction (TD) (according to ASTM D882) of a low of 150,000; 170,000; 190,000; 200,000; 210,000; or 220,000 pounds per square inch (psi) to a high of 300,000; 250,000; 240,000; 230,000; 220,000; 210,000; or 200,000 psi, with ranges from any of the foregoing lows to any of the foregoing highs contemplated (e.g., 220,000 to 230,000 psi, alternatively 190,000 to 200,000 psi).

Nonwoven and Fiber Products

Polyethylene compositions (or blends thereof) may be used to prepare nonwoven fabrics and fibers in any nonwoven fabric and fiber making process, including but not limited to, melt blowing, spun-bonding, film aperturing, and staple fiber carding. Examples include continuous filament processes, spun-bonding processes, and the like. The spunbonding process involves the extrusion of fibers through a spinneret. These fibers are then drawn using high velocity air and laid on an endless belt. A calender roll is generally then used to heat the web and bond the fibers to one another although other techniques may be used such as sonic bonding and adhesive bonding.

Polyethylene compositions (or blends thereof) according to embodiments disclosed herein are useful in a wide variety of applications where a low elastic modulus, low hysteresis and tensile set is desired. Examples of these applications include automotive overshoot parts (e.g., door handles and skins such as dashboard, instrument panel and interior door skins), house tool handles, airbag covers, toothbrush handles, shoe soles, grips, skins, toys, appliance moldings and fascia, gaskets, furniture moldings, and the like.

Other articles of commerce that can be produced include, but are not limited by, the following examples: awnings and canopies—coated fabric, tents/tarps coated fabric covers, curtains extruded soft sheet, protective cloth coated fabric, bumper fascia, instrument panel and trim skin, coated fabric for auto interior, geo textiles, appliance door gaskets, liners/gaskets/mats, hose and tubing, syringe plunger tips, light weight conveyor belt PVC replacement, modifier for rubber concentrates to reduce viscosity, single ply roofing compositions, recreation and sporting goods, grips for pens, razors, toothbrushes, handles, and the like. Other articles include marine belting, pillow tanks, ducting, dunnage bags, architectural trim and molding, collapsible storage containers, synthetic wine corks, IV and fluid administration bags, examination gloves, and the like.

Exemplary articles made using the polyethylene compositions (or blends thereof) of the present disclosure include cookware, storage ware, toys, medical devices, sterilizable medical devices, sterilization containers, sheets, crates, containers, packaging, wire and cable jacketing, pipes, geomembranes, sporting equipment, chair mats, tubing, profiles, instrumentation sample holders and sample windows, outdoor furniture, e.g., garden furniture, playground equipment, automotive, boat and water craft components, and other such articles. The polyethylene compositions (or blends thereof) can be suitable for automotive components such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles. The polyethylene compositions (or blends thereof) can be useful for producing "soft touch" grips in products such as personal care articles such as toothbrushes, etc.; toys; small appliances; packaging; kitchenware; sport and leisure products; consumer electronics; PVC and silicone rubber replacement medical tubing; industrial hoses; and shower tubing.

In some embodiments, to make filaments and non-woven fabrics of the present disclosure, a first step is to spin the fiber or filaments. Polyethylene compositions (or blends thereof) are fed into an extruder for melting and metering. The extruder parameters such as barrel and screw size and operating conditions such as temperature setting and screw RPM are known to skilled persons in the art. The melt is metered to pass the spinneret that has orifices. The number of the orifices depends on the size of equipment. The emitting filaments consequently attenuated (draw in machine direction) and cooled. In a spunbond process the filaments laydown on the moving belt to form un-bonded fabrics. One example to bond the unbonded fabric is called thermal point bonding which employs one smooth roll and one engrave roll. In addition to the spunbond process that is a continuous in-line from resin to fabric process, the filament may be collected in batches for subsequent processes such as cutting, carding and fabric forming and bonding processes. In another embodiment, when using an additional extruder and appropriate die arrangement and adapters, polyethylene compositions (or blends thereof) are coextruded with other polymers including but not limited to PET and polypropylene, to make bi-component fibers in core/sheath or side by side geometry. The resulting fabrics may have many applications from construction liners, house wrap membranes, hygiene, among others.

EXAMPLES

Polymerization Process Description

CE4, IE1 and IE2 were produced in a single slurry loop reactor with ethylene fed as monomer. The reactor conditions are included in Table 1 below, where triethyl aluminum (TEA1) and hydrogen are variables to produce CE4, IE1 and IE2. Hydrogen is a chain transfer agent that adjusts the molecular weight of the polymer. TEA1 is a co-catalyst that not only promotes productivity of the catalyst, but also is known as a chain transfer agent that promotes lower molecular weight fraction and increases MIR of the polymer, as exemplified in Table 1 of US2003-0045659A1.

It would be expected that, acting as chain transfer agent, TEA1 would reduce polymer chain sizes. Surprisingly, a reversed effect of TEA1 was discovered: when an amount of TEA1 was increased from 75 ppm (CE4) to 225 ppm (IE1) while holding all other reactor conditions constant, MIR decreased from 39 to 34, and Mz/Mw ratio increased from 6.6 (CE4) to 7.7 (IE1), indicating higher molecular weight fraction growth. Similarly, using the same 225 ppm TEA1 and additional $H_2$ concentration (1.6× the $H_2$ concentration of reaction used to produce CE4), MIR for IE2 remained decreased at 34, and Mz/Mw ratio increased even further, to 9.1 (IE2). In addition, MI, as expected, increased substantially (to 2.7 g/10 min), due to presence of additional hydrogen. However, HLMI also increased concomitantly, resulting in the same MIR (34) as the lower-MI IE1.

TABLE 1

| | CE4 | IE1 | IE2 |
|---|---|---|---|
| | | modality | |
| Table 4 | unimodal | Unimodal | unimodal |
| $H_2$ concentration | base | base | 1.6x base |
| TEAl Concentration (ppm) | 75 | 225 | 225 |
| Density | 0.962 | 0.962 | 0.966 |
| MI | 0.7 | 0.7 | 2.7 |
| HLMI | 27 | 24 | 91 |
| HLMI/MI | 39 | 34 | 34 |

It has been discovered that the use of alkyl, specifically triethylaluminum, to modify molecular weight distribution in such a manner that increasing alkyl feed to the steady-state polymerization reactor can narrow the molecular weight distribution of the resulting resin instead of the expected broadening of said MWD. The resulting granules were compounded with a standard dosage of primary and secondary antioxidant, zinc stearate for characterization and further application studies.

Additives and Compounding

Prior to blown film extrusion, 500 ppm primary AO Irganox 1010, 1000 ppm secondary AO Irgafos 168 and 150 ppm of Zinc stearate were blended with the resins anc compounded by using a twin screw extruder. No nucleating agents were used. The setting and operations of a twin screw extruder were known to skill persons in the art.

Resin Characterizations and Tests

Below, CE4, IE1, and IE2, produced per description above, are compared against other available HDPE polymers. In connection with these properties and the discussion of these examples, the following test methods should be referenced: Melt index (2.16 kg) and High Load Melt index (21.6 kg) values were determined according to ASTM D1238 procedure B, such as by using a Gottfert MI-2 series melt flow indexer. Density values can be determined by displacement method according to ASTM D1505.

Rheology data can be determined using a TA Instrument model ARES-G2B via small amplitude oscillatory shear (SAOS) testing at 190° C. The testing specimens were compression molded using a press. The testing specimens had a diameter of 25 mm and a thickness of about 1.5 mm. The specimens were preheated to 190° C., and testing temperature was equilibrated hold at 190° C. for 5 mins prior to testing. The testing frequency was from 0.01 to 638 rad/s, and the oscillation strain was about 5% strain during the test.

Molecular weight data (Mz, Mn, Mw) and co-monomer distribution can be determined according to GPC method. In particular, the values are obtained by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 μm Mixed-B LS columns are used to provide polymer separation. Detailed analytical principles, parameters and methods are described in WO2019-246069A1. The Mz, Mn, Mw values disclosed are based on absolute method.

The comparative examples 1, 2, 3, 6 and inventive examples 1 and 2 were converted into monolayer films using an Alpine blown film line equipped with 90 mm screw, 160 mm OD die, 60 mil die gap, zone temperatures were set to between 420 to 435 degree f, BUR equal to 2.5, frost line height about 22 to 24 inches, output about 10 lbs/hr per inch die. Melt temperature was kept at about 420 degree F. Films with 1 mil nominal thickness were made. 1 mil film of CE4 was fabricated by using a Gloucester Blown film line equipped with a 2.5 inch screw, extrusion conditions and output rates are similar.

Film tensile properties were obtained per ASTM D882. Film 1% secant modulus properties were obtained per ASTM D882. Film tear properties were obtained per ASTM D1922. Film optical properties were obtained per ASTM D1003.

Duplicate monolayer film samples extruded as described above were cut into about 10 cm×about 10 cm for MVTR measurement, the exposed area for testing was 50 square centimeter according to ASTM F1249. 5 thickness measurements were made and average was used for calculation. The testing temperature was fixed at 37.8° C. Other testing procedures were performed according to ASTM F1249.

CE1 is ExxonMobil commercial unimodal grade HDPE HTA108.

CE2 is ExxonMobil commercial unimodal grade Exceed 1018HA.

CE3 is ExxonMobil commercial bimodal grade HDPE HD7845.30.

CE4 is ExxonMobil discontinued commercial bimodal grade HDPE HD7925.30.

CE5 is a Chevron Phillips Chemical commercial HDPE Marlex® 9659.

CE6, IE1 and IE2 are experimental HDPE resins (HDPE homopolymers).

Table 2 summarizes characterization of the comparative examples and the inventive examples.

TABLE 2

| | | CE1 | CE2 | CE3 | CE4 | CE6 | IE1 | IE2 |
|---|---|---|---|---|---|---|---|---|
| | | | | | modality | | | |
| | | unimodal | unimodal | bimodal | bimodal | unimodal | unimodal | unimodal |
| | | | | | Grade ID | | | |
| Table 2 | | HTA108 | Exceed1018 | HD7845 | HD7925 | exp. | exp. | exp. |
| Density | g/cc | 0.961 | 0.918 | 0.958 | 0.964 | 0.962 | 0.962 | 0.966 |
| MI | g/10 min | 0.7 | 1 | 0.45 | 2.5 | 0.7 | 0.7 | 2.7 |
| HLMI | g/10 min | 46 | 15 | 28 | 95 | 27 | 24 | 91 |
| MIR | n/a | 66 | 15 | 62 | 38 | 39 | 34 | 34 |
| Mn | dalton | 11,058 | 46,602 | 17,954 | 12,462* | 23,990 | 22,839 | 16,666 |
| Mw | dalton | 144,297 | 117,856 | 240,964 | 248,697* | 235,843 | 229,070 | 171,424 |
| Mz | dalton | 1,136,965 | 189,063 | 1,450,281 | 673,706* | 1,565,142 | 1,616,181 | 1,623,185 |
| Mw/Mn (PDI) | n/a | 13.0 | 2.5 | 13.4 | 20.0 | 9.8 | 10.0 | 10.3 |
| Mz/Mw | n/a | 7.9 | 1.6 | 6.0 | 2.7 | 6.6 | 7.1 | 9.5 |
| Mz/Mn | n/a | 102.8 | 4.1 | 80.8 | 54.1 | 65.2 | 70.8 | 97.4 |
| g' vis. | n/a | 0.96 | 1 | 0.74 | n/a | 0.72 | 0.73 | 0.73 |
| ZSV | Pa · s | 250948 | 6993.5 | 56916 | 11530.8 | 29057.9 | 22195.5 | 6461 |

*conventional (IR-based) GPC values

Table 3 illustrates rheology data determined using a TA Instrument model ARES-G2B via small amplitude oscillatory shear (SAOS) testing at 190° C.

TABLE 3

| | CE1 | CE2 | CE3 | CE4 | CE6 | IE1 | IE2 |
|---|---|---|---|---|---|---|---|
| | Angular frequency | | | | | | |
| | Complex viscosity | Complex viscosity | Complex viscosity | Complex viscosity rad/s | Complex viscosity | Complex viscosity | Complex viscosity |
| Table 3A | Pa · s | Pa · s | Pa · s | Pa · s | Pa · s | Pa · s | Pa · s |
| 628.319 | 390.874 | 888.349 | 491.95 | 279 | 548.332 | 561.31 | 374.8 |
| 396.442 | 531.642 | 1233.72 | 687.113 | 369.365 | 749.797 | 764.922 | 492.78 |
| 250.138 | 702.832 | 1611.76 | 930.822 | 471.683 | 993.427 | 1009.3 | 628.365 |
| 157.826 | 910.699 | 2053.77 | 1228.07 | 591.27 | 1276.78 | 1290.89 | 781.065 |
| 99.5818 | 1167.31 | 2551.67 | 1609.55 | 731.187 | 1625.22 | 1634.43 | 955.003 |
| 62.8319 | 1482.89 | 3095.19 | 2098.79 | 893.985 | 2051.39 | 2051.06 | 1151.13 |
| 39.6442 | 1868.08 | 3663 | 2690.87 | 1080.37 | 2538.75 | 2522.38 | 1367.65 |
| 25.0138 | 2334.22 | 4226.05 | 3413.02 | 1288.57 | 3100.11 | 3058.67 | 1602.38 |
| 15.7826 | 2894 | 4781.36 | 4277.74 | 1523.12 | 3733.41 | 3656.73 | 1846.03 |
| 9.95818 | 3557.01 | 5254.95 | 5291.86 | 1780.3 | 4432.96 | 4307.99 | 2104.9 |
| 6.28319 | 4328.81 | 5661.14 | 6466.43 | 2060.4 | 5180.8 | 4994.62 | 2372.43 |
| 3.96442 | 5248.26 | 5989.78 | 7781.41 | 2361.27 | 6000.17 | 5736.93 | 2643.6 |
| 2.50138 | 6297.77 | 6217.11 | 9246.28 | 2674.27 | 6851.9 | 6496.88 | 2909.8 |
| 1.57826 | 7516.28 | 6404.79 | 10873.7 | 3005.19 | 7745.72 | 7283.1 | 3177.26 |
| 0.995818 | 8908.65 | 6543.68 | 12638.1 | 3347.92 | 8673.27 | 8086.95 | 3438.22 |
| 0.628319 | 10466 | 6644.06 | 14496.3 | 3696.11 | 9610.96 | 8888.19 | 3687.42 |
| 0.396442 | 12295.2 | 6723.41 | 16487.5 | 4057.81 | 10577.5 | 9691.61 | 3928.03 |
| 0.250138 | 14273.1 | 6791.23 | 18528.7 | 4419.05 | 11547.9 | 10493.7 | 4151.82 |
| 0.157826 | 16453.6 | 6846.52 | 20630 | 4786.33 | 12516.6 | 11261.4 | 4364.48 |
| 0.0995818 | 18904.3 | 6883.83 | 22797 | 5141.26 | 13474.5 | 12023.6 | 4568.54 |
| 0.0628319 | 21478.1 | 6919.74 | 24944 | 5505.27 | 14428.6 | 12767.3 | 4750.52 |
| 0.0396442 | 24288.5 | 6939.24 | 27100.4 | 5852.83 | 15344.2 | 13461 | 4960.85 |
| 0.0250138 | 27142.1 | 6968.36 | 29165.2 | 6191.46 | 16226.1 | 14196.2 | 5066.88 |
| 0.0157826 | 30233.4 | 6972.44 | 31223.8 | 6497.93 | 17158 | 14789.5 | 5213.91 |
| 0.01 | 32914.8 | 6960.62 | 32868.8 | 6763.39 | 18011.7 | 15432.4 | 5349.25 |

Table 4 illustrates film physical properties and barrier properties.

TABLE 4

| Commercial grade | | CE1 HTA108 | CE3 HD7845.30 | CE4 HD-7925.30 | CE6 experimental | IE1 experimental | IE2 experimental |
|---|---|---|---|---|---|---|---|
| Film Gauge (mil) | | 0.99 | 0.99 | 1.06 | 0.97 | 0.99 | 0.99 |
| BUR | | 2.5 | 2.5 | n/a | 2.5 | 2.5 | 2.5 |
| Frost line height (inch) | | 22 | 23 | n/a | 22 | 22 | 24 |
| Melt Pressure(psi) | | 3738 | 5381 | n/a | 5525 | 4845 | 3010 |
| Melt temperature (F.) | | 418.9 | 427.8 | n/a | 424.4 | 427.8 | 416.4 |
| Specific output (#/hr/RPM) | | 9.58 | 9.35 | n/a | 9.53 | 9.39 | 9.45 |
| Tensile | ASTM D882 | | | | | | |
| Yield Strength (psi) | | | | | | | |
| MD | | 4510 | 5060 | 5219 | 4570 | 4380 | 4570 |
| TD | | 5040 | 5180 | 1945 | 5110 | 5410 | 5020 |
| Tensile Strength (psi) | | | | | | | |
| MD | | 8384 | 11676 | 7468 | 10938 | 10674 | 6116 |
| TD | | 5036 | 5176 | 5343 | 4187 | 5414 | 5024 |
| MD/TD | | 1.7 | 2.3 | 1.4 | 2.6 | 2.0 | 1.2 |
| 1% Secant Modulus (psi) | ASTM D882 | | | | | | |

TABLE 4-continued

| Commercial grade | | CE1 HTA108 | CE3 HD7845.30 | CE4 HD-7925.30 | CE6 experimental | IE1 experimental | IE2 experimental |
|---|---|---|---|---|---|---|---|
| MD | | 152424 | 153140 | 172188 | 156775 | 148479 | 147328 |
| TD | | 207719 | 220433 | 243226 | 227335 | 227690 | 195151 |
| Haze | | | | | | | |
| Haze Total % | ASTM D1003 | 39 | 58 | 23 | 28 | 23 | 27 |
| Elmendorf Tear | ASTM D1922 | | | | | | |
| MD (g) | | 10.6 | 8.2 | 9 | 10.4 | 12.8 | 15.2 |
| TD (g) | | 785 | 1296 | 824 | 1257 | 1123 | 113 |
| TD/MD | | 74 | 158 | 92 | 121 | 88 | 7 |

Table 5 illustrates film MVTR properties of the comparative and example films.

TABLE 5

| Sample | test # | MVTR (g-mil/m$^2$/day) | MVTR (g-mil/100 inch$^2$/day) |
|---|---|---|---|
| CE1-HTA108 | test 1 | 8.4 | 0.542 |
| | test 2 | 11.8 | 0.761 |
| CE2 Exceed 1018 | test 1 | 20.4 | 1.317 |
| | test 2 | 20.8 | 1.344 |
| CE3-HD7845 | test 1 | 12.6 | 0.813 |
| | test 2 | 14.8 | 0.955 |
| CE4-HD7925 | test 1 | 9.2 | 0.593 |
| CE5- Marlex 9656 | on line PDS, 1 mil sample | / | ~0.7 |
| IE1-HX6901, | test 1 | 13.5 | 0.871 |
| | test 2 | 16.0 | 1.032 |
| IE2, HX6903, | test 1 | 6.0 | 0.387 |
| | test 2 | 6.4 | 0.413 |

Polyethylene viscosity decreases with increasing temperature or decreasing molecular weight. For linear PE over a wide range of MWD, the zero shear viscosity (i.e. the shear viscosity in the limit of zero shear rate) is:

$$Eta0=(K)\left(M_w^{3.4}\right)\exp(E/RT)$$

where the 3.4 power law index was first reported by Fox and Flory in J. Phys. Chem. 1951, 55, 2, 221-234. R is the gas constant, and T is the absolute temperature. E is the flow activation energy. This ZSV and Mw correlation can be simplified to below Eta0=C*$Mw^{3.4}$, C is the ratio of Eta0 to $Mw^{3.4}$.

All CEs are considered substantially linear polyethylene and examples of different categories of commercial PE: bimodal and unimodal, broad and narrow molecular weight distribution as illustrated by Table 6. The values Eta0/$Mw^{3.4}$ of all comparative examples were found to be between 2.9E-14 to 7.2E-13 ($2.9\times10^{-14}$ to $7.2\times10^{-13}$). The values appear to be in agreement with 5.8E-14 published in the Journal of Molecular Structure 485-486 (1999) 569-584, and 3.66E-14 published in POLYMER ENGINEERING AND SCIENCE, (1999), Vol. 39, No. 4, 741-748. The Eta0/$Mw^{3.4}$ values of the inventive examples are significantly lower: 1.3E-14 and 1.0E-14, respectively.

TABLE 6

| Sample | Modality | MIR | Eta0/$Mw^{3.4}$ |
|---|---|---|---|
| CE1-HTA108 | Unimodal | 66-broad | 7.2E−13 |
| CE2 Exceed 1018 | Unimodal | 15-narrow | 4.0E−14 |
| CE3-HD7845 | bimodal | 62-broad | 2.9E−14 |
| CE4-HD7925 | bimodal | 38-narrow | 3.5E−14 |
| CE6-experimental | Unimodal | 39 | 1.6E−14 |
| IE1-experimental | Unimodal | 34 | 1.3E−14 |
| IE2-experimental | Unimodal | 34 | 1.0E−14 |

All samples, including IE2 with MI=2.7, could be extruded into films using the industrial scale blown film line. The extrusion conditions was described in a previous paragraph of this document.

IE2 has the highest MI of 2.7, a typical MI for cast film and injection molding. IE2 is unimodal, but its unique molecular structure makes it feasible to blow film using industrial scale extrusion conditions. Compared with unimodal CE1 and CE2, IE2 has significantly higher Mw; and compared with bimodal CE3 and CE4, IE2 has higher or similar Mz. Its highest Mz/Mw makes it different from all comparative unimodal and bimodal resins.

CE1 is a unimodal commercial homo-polymer HDPE like IE2, with good MVTR, suitable for barrier applications. CE1 and IE2 are both homo-polymers, CE1 has lower Mw and Mn and is expected to crystalize better than IE2, and a lower MVTR value is expected from CE1. Surprisingly, IE2 has significantly lower MVTR than CE1. The low shear viscosity and shear thinning behavior SAOS data show these 2 resins respond to shear differently, indicating IE2 with higher molecular weight could crystalize better than CE1. Indeed, IE2 differs from CE1 in both molecular structure and properties.

IE2 is also found to have better barrier properties than CE2, CE3, CE4 and IE1. The advantage may be assigned to the combination of co-monomer content, molecular weight, and molecular weight distribution. The very low viscosity of IE2, as shown in the SAOS plot, helps the molecules to crystalize better under residue stress in a film extrusion process during cooling. Molecular structure of IE2 is in a sweet spot that helps to maximize the barrier, but still filmable in a blown film process.

In addition, IE2 is found to have lower MVTR than CE5-Marlex 9656 when specimens have the same thickness (1 mil).

Besides the barrier properties, IE2 differs from some or all CEs as IE2 has lower haze and better MD/TD balance on tear and tensile.

It is apparent that IE2 had the low melt pressure and melt temperature, it is easier to process and save energy.

Overall, methods of the present disclosure provide polyethylene compositions, such as unimodal HDPE compositions. It has been discovered that an amount of a cocatalyst can affect the molecular weight distribution of polyethylene compositions of the present disclosure. For example, increasing an amount of cocatalyst may decrease the melt index ratio of a polyethylene composition which, without being bound by theory, provides polymer molecules to crystallize better under stress in a film in an extrusion process. Increasing an amount of cocatalyst can also increase the Mz/Mw value of a polyethylene composition, indicating higher molecular weight fraction growth, even though a reduction in MIR has been provided. Accordingly, a polyethylene composition of the present disclosure can have a low enough melt index for blown film processes. The films can also provide a low MVTR value, low haze, and good barrier properties, and the presence of a nucleating agent in a composition, blend, or film is merely optional and, in some embodiments, not present at all. The films can provide such advantages with relatively thin thickness, providing advantageous use as food packaging.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

We claim:

1. A method of making a polyethylene composition, the method comprising:

introducing ethylene, an optional comonomer, a diluent, a catalyst, and 100 ppm to 500 ppm of a cocatalyst (on the basis of amount of diluent) to a loop reactor under conditions effective to produce a slurry comprising the polyethylene composition;

continuously discharging a portion of the slurry from the loop reactor as effluent comprising the polyethylene composition;

flashing the effluent to vaporize diluent and form a concentrated effluent comprising the polyethylene composition; and condensing the vaporized diluent, wherein the polyethylene composition comprises 80 wt % or greater ethylene-derived units and has:

a density within the range from 0.935 to 0.975 g/cm$^3$;

a melt index ($I_{2.16}$) of 2 g/10 min to 4 g/10 min;

a weight-average molecular weight (Mw) of 90,000 g/mol to 300,000 g/mol;

a number-average molecular weight (Mn) of 15,000 g/mol to 30,000 g/mol;

a z-average molecular weight (Mz) of 700,000 to 3,000,000 g/mol;

an Mw/Mn value of 9 to 12;

an Mz/Mw value of 5 to 10;

an Mz/Mn value of 65 to 80;

a g' value of 0.6 to 0.85; and a unimodal molecular weight distribution.

2. The method of claim 1, wherein the polyethylene composition has a value of Eta0/Mw3.4 of less than $2\times10^{-14}$.

3. The method of claim 1, wherein the cocatalyst is triethyl aluminum in an amount of 200 ppm to 250 ppm, in mass ratio to the diluent in the loop reactor.

4. The method of claim 1, wherein the conditions comprise:

a reactor temperature of 95° C. to 105° C., and a reactor pressure of 450 psig to 650 psig.

5. The method of claim 1, further comprising introducing hydrogen to the loop reactor such that the hydrogen is present in the loop reactor in an amount of 800 ppm to 2,000 ppm.

6. The method of claim 5, wherein the hydrogen is present in the loop reactor in an amount of 1,500 ppm to 1,700 ppm.

7. The method of claim 1, wherein introducing the ethylene to the loop reactor is performed at an ethylene concentration in the loop reactor of 3 wt % to 7 wt %, based on the total weight of contents in the loop reactor.

8. The method of claim 1, wherein the polyethylene composition is a polyethylene homopolymer composition.

9. The method of claim 1, wherein the slurry comprises a weight percent of polymer solids of 45 wt % to 65 wt %, based on a total weight of the slurry.

10. The method of claim 1, wherein a residence time of the polyethylene composition in the loop reactor is 0.5 hour to 1.5 hours.

11. The method of claim 1, wherein the catalyst comprises titanium and magnesium.

12. The method of claim 1, wherein the cocatalyst is selected from the group consisting of triethyl aluminum, tri-isobutyl aluminum, tri-n-hexyl aluminum, tri-n-octylaluminum, and combination(s) thereof.

13. The method of claim 1, wherein the diluent is isobutane.

14. A polyethylene composition, comprising:

80 wt % or greater ethylene-derived units;

wherein the polyethylene composition has:

a density within the range from 0.935 to 0.975 g/cm$^3$;

a melt index ($I_{2.16}$) of 2 g/10 min to 4 g/10 min;

a weight-average molecular weight (Mw) of 90,000 g/mol to 300,000 g/mol;

a number-average molecular weight (Mn) of 15,000 g/mol to 30,000 g/mol;

a z-average molecular weight (Mz) of 700,000 to 3,000,000 g/mol;

an Mw/Mn value of 9 to 12;

an Mz/Mw value of 5 to 10;

an Mz/Mn value of 65 to 80;

a g' value of 0.6 to 0.85; and a unimodal molecular weight distribution.

15. The method of claim 1, wherein the polyethylene composition has a value of Eta0/Mw3.4 is less than $2\times10^{-14}$.

16. The polyethylene composition of claim 14, wherein the polyethylene composition has: a high load melt index (HLMI) of 80 g/10 min to 100 g/10 min, and a melt index ratio of 15 to 45.

17. The polyethylene composition of claim 14, wherein the melt index ratio is 30 to 35.

18. The polyethylene composition of claim 14, wherein the polyethylene composition has one or more of the following properties:

a complex viscosity (at 628 rad/s, 190° C.) of 300 Pa*s to 400 Pa*s;

a complex viscosity (at 100 rad/s, 190° C.) of 900 Pa*s to 1,100 Pa*s;

a complex viscosity (at 0.01 rad/s, 190° C.) of 3,000 Pa*s to 4,000 Pa*s;

a yield strength in the machine direction (MD) of 4,000 psi to 4,800 psi;

a yield strength in the transverse direction (TD) of 5,000 psi to 5,200 psi;

a tensile strength in the machine direction (MD) of 6,000 psi to 7,000 psi;

a tensile strength in the transverse direction (TD) of 5,000 psi to 5,200 psi;

a flexural 1% secant modulus in the machine direction (MD) of 140,000 psi to 160,000 psi; and a flexural 1% secant modulus in the transverse direction (TD) of 190,000 psi to 200,000 psi.

19. A film comprising the polyethylene composition of of claim 14, wherein the film has a thickness of 1 μm to 50 μm and comprises a nucleating agent content of 1,000 ppm or less, based on a total weight of the film.

20. The film of claim 19, wherein the film has one or more of the following properties:

(i) a moisture vapor transition rate (MVTR) of 2 to 8 g-mil/m$^2$/day, when the measurement is made on a 1 mil film; and (ii) a haze of 20% to 28%.

* * * * *